March 6, 1956   J. S. HEISLER ET AL   2,736,925
METHOD OF FORMING HOLLOW ARTICLES FROM POLYETHYLENE
Filed June 8 1953   3 Sheets-Sheet 1

FIG.I.

INVENTORS.
JEROME S. HEISLER
ALBERT HEISLER
ANTHONY J. STARR
BY George H. Corey
THEIR ATTORNEY.

March 6, 1956     J. S. HEISLER ET AL     2,736,925
METHOD OF FORMING HOLLOW ARTICLES FROM POLYETHYLENE
Filed June 8 1953     3 Sheets-Sheet 2

INVENTORS.
JEROME S. HEISLER
ALBERT HEISLER
ANTHONY J. STARR
BY
THEIR ATTORNEY.

March 6, 1956 J. S. HEISLER ET AL 2,736,925
METHOD OF FORMING HOLLOW ARTICLES FROM POLYETHYLENE Filed June 8 1953 3 Sheets-Sheet 3

INVENTORS.
JEROME S. HEISLER
ALBERT HEISLER
ANTHONY J. STARR
BY
THEIR ATTORNEY.

United States Patent Office 2,736,925
Patented Mar. 6, 1956

2,736,925

METHOD OF FORMING HOLLOW ARTICLES FROM POLYETHYLENE

Jerome S. Heisler, Albert Heisler, and Anthony J. Starr, Wilmington, Del., assignors, by mesne assignments, to Jerome S. Heisler and Albert Heisler, both of Wilmington, Del.

Application June 8, 1953, Serial No. 360,214

10 Claims. (Cl. 18—55)

This invention relates to new and improved method of molding polyethylene containers. In one of its aspects, this invention relates to a shipping or package unit comprising a molded polyethylene container adapted to be inserted within a conventional shipping container such as metal pails and drums or it may be associated with a more or less rigid overpack of plywood, fiberboard or the like.

The normally solid polymers of ethylene, sometimes referred to as "polythenes" and "alkathenes" and hereinafter referred to collectively as the "polyethylenes," possess a number of desirable properties which commend them for use in forming containers for the transportation and storage of various materials, particularly chemicals of various kinds including many chemicals that are corrosive or easily contaminated if brought into contact with metal surfaces. Polyethylenes have a relatively low density, are chemically inert, and in sheet or strip form are flexible and possess high tear resistance. Moreover, since the polyethylenes are thermoplastic they lend themselves to fabrication into various shapes by various procedures involving the application of heat.

Because of these and other desirable properties, attempts have been made to utilize polyethylene in the fabrication of containers for the transportation and storage of materials. Satisfactory fabrication techniques have been developed for the blow molding of relatively small polyethylene containers such as bottles. Polyethylene carboys having a capacity of about 14 gallons have also been made by a combination of injection and blow molding employing large and expensive molding equipment. However, polyethylene carboys made by this technique are relatively thick walled and have the disadvantage that they contain only a centrally located externally threaded outlet. Like the conventional glass carboy these polyethylene carboy-shaped containers must be packed within an enclosure having a shape entirely different from that of the carboy before the carboy can be safely and conveniently shipped and handled in transit. As a result the space occupied by the packaged carboy is much greater than the actual volumetric capacity of the carboy itself. Freight rates on carboys whether formed of glass or plastic are very much higher than those which apply to many other shipping containers such as metal drums, barrels and other more space saving types of containers.

It is one of the principal objects of this invention to produce molded polyethylene containers that may be fitted with and which closely conform to the walls of conventional shipping containers such as metal pails and drums, which containers serve as overpacks in giving the composite container the desired rigidity for handling and shipping purposes but which overpack would be unsuitable by itself to hold the contents of the interior molded polyethylene container.

Another object of this invention is to provide a new and improved method of molding polyethylene containers which lends itself to large scale or mass production operations in the manufacture of containers having a wide variety of sizes and shapes.

It is a further object of this invention to provide a method for the manufacture of molded polyethylene containers, which is relatively inexpensive to practice, requires simple forms and types of equipment and calls for only moderate requirements as regards labor and supervision.

It is a further object of this invention to produce improved molded polyethylene containers wherein the side walls and the top and bottom of the container are integrally joined without pronounced rounding of the walls at their points of intersection, thereby insuring a maximum volumetric capacity for the container as well as reinforcing contact between the overpack and the container adjacent the top and bottom rims and corners of assembled overpack and container.

It is another object of this invention to produce a closed, integrally molded polyethylene container having outlets suitably located on the top thereof at any desired location, and preferably also externally and internally threaded to receive suitable closures.

It is yet another object of this invention to produce molded polyethylene containers that are adequately self-supporting for handling and assembly with a suitable overpack and at the same time are highly resistive to rupture when the assembly is subjected to severe drop tests and rough handling and yet which require for their manufacture a much smaller amount of polyethylene than is required for containers of similar capacity made by the practices known heretofore.

These and other objects of this invention and how they are accomplished will become apparent with reference to the accompanying disclosure and drawings wherein.

Figure 4:
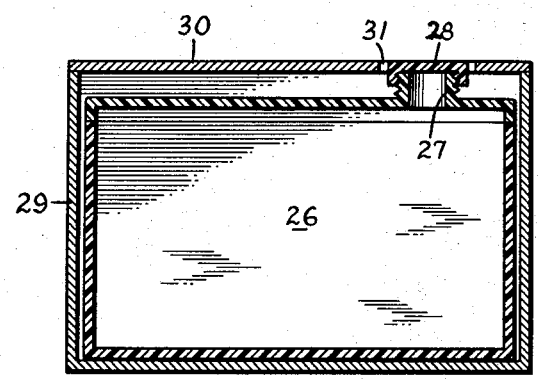
Figure 3:
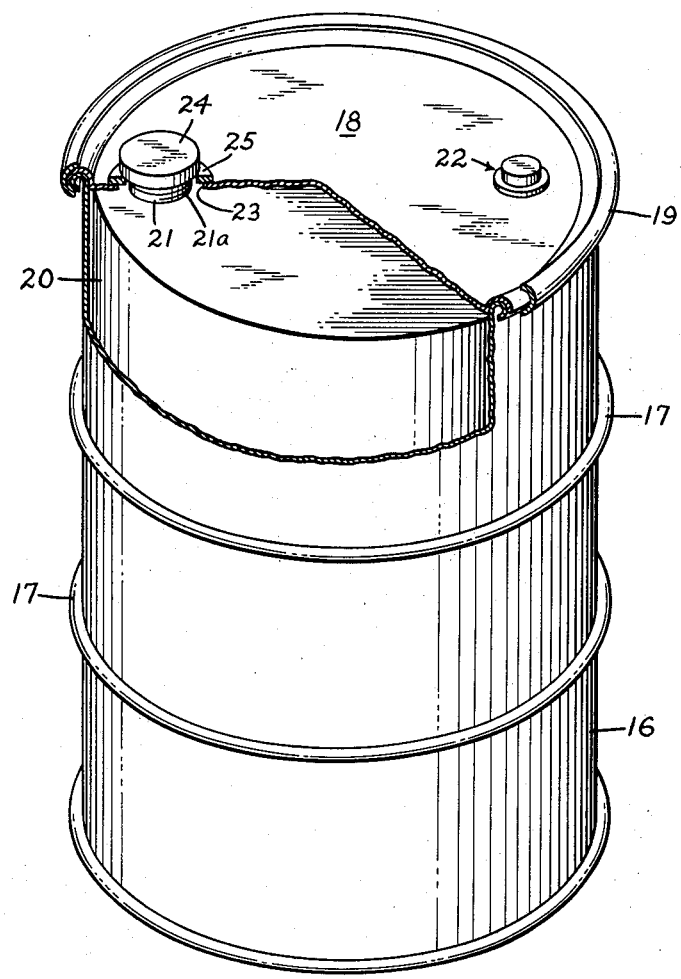

Fig. 3 is a perspective view of a packaged shipping unit containing a closed-ended powder molded polyethylene container having the shape of a right angle cylinder or drum. In this figure the rigid shipping enclosure or overpack is partially broken away to reveal the polyethylene container therein and to illustrate more clearly how the container outlets project through the top cover of the overpack; and Fig. 4 is a vertical cross section taken through a cube-shaped shipping unit comprising a rigid cubical enclosure or overpack and a cube-shaped, closed powder molded polyethylene container having an externally and internally threaded and covered outlet near a corner of the top.

The present invention in its broader aspects is based on our discovery that it is possible to build up dense, liquid impervious, homogeneous coatings of polyethylene on metal surfaces by the use of polyethylene in powder form applied to such surfaces under suitable controlled conditions as to preheat of the metal surface and application of the polyethylene powder to the heated metal surface as more fully brought out hereinafter. This broad concept as applied to the formation of coatings or liners directly upon the inner walls of containers or other metal surfaces is disclosed in our copending application Ser. No. 185,254, filed September 16, 1950. We have now found that this procedure may be employed in forming self-sustaining containers or container elements by using molds of suitable shape and composition, then forming the coatings on the mold walls with as many applications and repetitions of the preheating, coating, reheating and baking steps as desired, and then finally cooling the mold and stripping the molded polyethylene shape away from the mold.

The mold

The surfaces of the mold sections when assembled should conform to the desired exterior surface of the molded closed-ended polyethylene container to be produced. Generally, for the manufacture of a molded polyethylene container having the shape of a right angle cylinder, such as a conventional steel drum, not more than two mold sections are required, a body section, the internal surfaces of which conform to those of an open ended drum except that the side surfaces will not be indented, and a cover section, the inner surface of which conforms to the inside surface of the cover for the drum with the usual openings therein for the bung and the vent. The openings in the cover mold will be closed during the steps of building up the molded cover section of the container as more particularly hereinafter described.

In those cases where the shape of the body portion of the container is such to render it impractical or impossible of being removed from a one-piece mold, the mold may be made up in sections which permit of ready separation from the body of the molded polyethylene container.

The molds may be made up of any suitable material which is capable of withstanding temperatures in the range 300–475° F. without any deformation due to heat. Suitable materials which may be used for the manufacture of molds include black iron such as 18 gauge black iron, stainless steels, metal-clad materials, aluminum, copper, etc. Preferably the molds should be made of a material which is readily removable from the polyethylene molded thereon and to which polyethylene does not tend to strongly adhere.

The heat capacity, heat conductivity and mass of material making up the mold influences the thickness of the polyethylene coating which can be formed thereon in any one powder coating operation. Usually a metal mold is preferred. When using a given metal, the thicker the walls of the mold the more heat will be contained therein and accordingly more of the polyethylene powder can be sintered and built up thereon to form a coating. At the same time, usually no advantage is gained from forming the mold walls of a thickness beyond that which will insure sufficient heat content to permit of the sintering during one application of sufficient of the polyethylene particles to form a layer of a thickness of around 10 to 20 mils. It is desirable to subject the sintered particles forming one layer to a baking treatment involving at least incipient fusing of the freshly applied layer of sintered particles before applying an additional coat. At the same time, of course, the mold acquires additional heat to be given off in a succeeding powder coating step.

In order to facilitate the removal of the molded polyethylene product from the mold surface it is desirable to coat the surface of the mold prior to forming any polyethylene coating thereon with a suitable mold release agent for polyethylene such as a silicone compound in the form of a liquid or grease.

Figure 2:
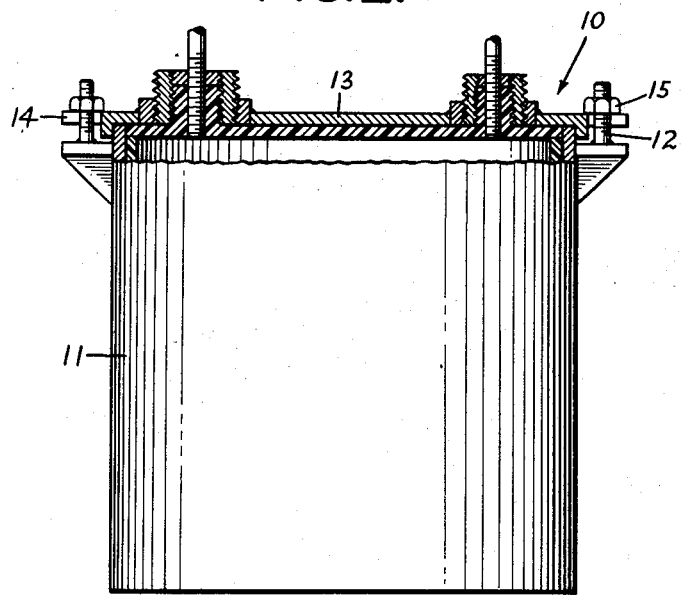
Fig. 2 is a part vertical section and part elevation through a mold used in practicing the invention with the mold sections assembled and a molded container disposed therein.

In Fig. 2, there is shown a mold 10 made up of a body section 11 provided with threaded lugs 12 and a cover section 13 provided with cooperating lugs 14 having openings therethrough to receive the lugs 12 when the two sections are assembled and held together by nuts 15 during the final stage of the molding operation as will be described in further detail later on herein.

The polyethylene powder

The fineness and shape of the particles of the polyethylene employed in the manufacture of the molded polyethylene containers in accordance with this invention have been found to have an important bearing on the properties of the molded product and also to some extent affect the rate and extent to which a coating can be built on the mold surfaces during each coating step. Accordingly, these factors should be taken into consideration in the determination of the optimum coating conditions, such as the preheat temperature of the mold, rate of application of the powder, degree or extent of wiping pressure applied, etc. For example, it has been found that a mold made from a given material and having a given wall thickness should be brought to a somewhat higher temperature the greater the average particle size of the polyethylene particles employed. It has also been found that the fusion of the polyethylene particles upon the mold surface and the resulting formation of a polyethylene coating or film thereon proceeds more rapidly when the polyethylene particles are generally spherical in shape as compared with a polyethylene powder the particles of which are more or less triangular and irregular in shape.

The molecular weight of the polyethylene employed in the production of the molded polyethylene containers may vary over a wide range, e. g. 10,000–32,000. Excellent results have been obtained by employing a polyethylene powder having a molecular weight of about 19,000 and with a particle size of the polyethylene powder in the range 50–100 mesh. Polyethylene powder having an average particle size of 80 mesh has been found to be most suitable. Another suitable polyethylene powder as supplied by the manufacturer has a molecular weight of approximately 19,000 and a fineness of 100% through a 40 mesh sieve, 85% through a 50 mesh sieve and approximately 50% through an 80 mesh sieve. Still another polyethylene powder having a molecular weight of about 19,000 and a fineness of 90% through a 20 mesh sieve gave satisfactory results.

Preheating

At the commencement of the molding operation the molds are preheated to a suitably elevated temperature having in mind that it is necessary to insure sintering of the particles of the polyethylene powder and the building up of the coating to an adequate degree during each application of powder to the mold surfaces while at the same time avoiding fusion and the running of the fused polyethylene away from the coated surfaces. Likewise, the temperature to which the molds have been preheated should not be such as will cause charring or thermal decomposition of the polyethylene particles thereon. It has been found in actual operation that a mold preheat temperature in the range 325–365° F. produces very satisfactory results. Somewhat higher or lower preheat temperatures may be employed depending upon such features as the point of incipient fusion or sintering for the particular ethylene polymer used, the particle size of the polyethylene powder, the thickness of the polyethylene coating to be deposited, and the mass and specific heat of the material making up the molds.

In the ensuing description the invention will be described in its presently preferred form as applied in the production of closed-ended molded polyethylene containers having the shape of a right angle cylinder such as a drum of about 55 gal. capacity.

In the manufacture of drum-shaped polyethylene containers, preferably two mold sections are employed, a shell or body mold section for forming the sides and bottom of the polyethylene drum or container and a cover mold section for forming the top of the container. Mold sections made of 18 gauge black iron have worked very satisfactorily. In the manufacture of 50–55 gal. closed-ended powder molded polyethylene drums, the body mold section is preferably heated to a temperature of about 360° F. This can conveniently be done by placing the body mold section for about 25 minutes in an oven maintained at this temperature. The cover mold section is preferably preheated to a temperature in the range 325–365° F.

Although higher temperatures than those above specified may be employed, it is found that tendency to cracking is reduced by operating at lower temperatures consistent with the storing of sufficient heat in the mold to insure a satisfactory build up of the polyethylene layer during the course of a given step of applying the powder to the heated mold surfaces. After the molds have been brought to a convenient and satisfactory temperature the actual deposition of a polyethylene coating thereon is commenced.

*Formation of polyethylene coating*

Actual operating experience has shown that the manner of application of polyethylene powder to the cover and body molds is extremely important from the standpoint of insuring a satisfactory coating. Merely adding or applying to the heated surface of the mold a quantity of polyethylene powder calculated to produce the desired thickness of coating and then allowing the mold to cool does not produce a satisfactory result.

When the surface of the mold is substantially planar such as in the case of a cover mold it has been found necessary to apply the polyethylene powder in such a way as positively to insure that the polyethylene particles in immediate contact with the heated mold surface become softened and incipiently fused or sintered onto the surface of the mold to form an adherent coating. Additional polyethylene particles are brought into contact with the coating constituted by such previously sintered particles under such conditions as will insure a rapid heat transfer to these additional particles so as to bring their temperature to the sintering point of the polyethylene with the result that they too will become softened and form part of the coating. This action continues so long as additional polyethylene particles are brought into contact with the previously formed polyethylene coating under conditions insuring rapid heat transfer between the added particles and the previously formed coating and the temperature of that coating and the underlying metal surface remains sufficiently high to cause the added polyethylene particles to become incipiently fused and coalesced with the underlying coating. An excess of polyethylene particles over that required to give the desired thickness of coating in one operation is preferred. However, merely providing an excess of polyethylene particles and allowing the particles to remain quiescent thereon will not insure the coating of a desired thickness and quality. During or immediately after the application of the polyethylene particles to the surface of the cover mold, force is applied to the mass of polyethylene particles in a direction toward and along the surface of the mold so as to uniformly distribute the mass of polyethylene particles over the entire surface of the cover mold and force them into intimate contact with one another and with the mold surfaces. At the same time any voids between the particles are filled up.

This particular manner of applying force to the polyethylene particles results in a wiping action of the particles immediately adjacent the heated cover mold surface upon the mold surface. This pressing and wiping action is continued as long as sufficient heat is available to soften and at least partly fuse or sinter the polyethylene particles immediately adjacent the mold surface and the polyethylene coating deposited thereon. When the temperature of the cover mold and the polyethylene coating deposited thereon has been reduced to a point where no more softening and sticking of additional polyethylene particles to the previously adhered coating takes place, the excess of polyethylene powder is dusted from the cover mold surface. It is important that this excess polyethylene be removed to avoid the formation of bubbles and other surface irregularities in the polyethylene coating during subsequent reheating and baking operations.

In the situation where preformed molded polyethylene outlet flanges are not provided in the cover mold these relatively thick molded polyethylene outlet flanges may be produced and molded directly into the polyethylene coating by the method described in our co-pending patent application Serial No. 375,625, filed August 21, 1953. As disclosed in the above-identified patent application, a mold made up of a planar-surfaced member which may take the form of the top section of the container with a threaded opening or openings therein is associated with internally and externally threaded annular members and with a spacing ring fitting between and in threaded engagement with the annular members to define an annular mold cavity having thread defining recesses in its side walls and receiving polyethylene particles which are pressed thereinto to completely fill the annular mold cavity and to contact the surrounding generally planar surfaces of the rest of the mold. The mold so filled is then heated at a suitable temperature until the polyethylene particles packed therein soften and coalesce or fuse together to form a layer that is relatively smooth and grainy or even glassy in appearance. Thereafter, additional polyethylene particles are pressed into the mold with a wiping action as aforesaid until the mold is completely filled and again the packed mold is subjected to a heat treatment. Following each of the mold filling operations care is taken to remove any excess polyethylene powder from the mold before reheating so as to prevent bubble formation and surface irregularities in the resulting molded article. These operations of filling a heated mold with polyethylene powder and pressing the powder thereinto, followed by a subsequent heat treatment, are continued until the complete molded article having the desired dimensions and carrying a threaded flanged outlet has been formed.

The formation of polyethylene coating upon the surface of the body mold is preferably carried out in a manner somewhat different from that of producing a polyethylene coating on the surface of the cover mold, although basically the principle is the same. An excess of polyethylene powder over the amount of polyethylene required to form the desired thickness of polyethylene coating in one coating operation is added to the body mold with the mold preheated preferably to about 360° F. It is preferred that when the polyethylene powder is first added to the body mold, the body mold is in a substantially upright position. Indicative of the amount of polyethylene powder employed in the formation of a coating on the surface of a body mold, it is pointed out that in the manufacture of a molded polyethylene drum having a capacity of 15 gals. about 10 lbs. of polyethylene powder are added directly to the body mold. This amount of polyethylene is greatly in excess of that required for the finished product which usually contains from 3 to 4 lbs. of molded polyethylene and is sufficient to fill the body mold to about one-quarter to one-half its capacity.

After the addition of the polyethylene powder to the body mold, the mold is rotated while at the same time it is continuously being inclined toward the horizontal. During the rotation of the body mold, it is desirable to reverse the direction of rotation while at the same time still inclining the body mold toward the horizontal, so as to insure a uniform distribution of the polyethylene powder on the surface of the body mold. During rotation and as the body mold is inclined toward the horizontal and the polyethylene powder tumbled therein, the excess polyethylene powder commences to spill out of the body mold and is collected in a suitable container or trough. After a short period of time, usually less than a minute, the excess polyethylene not adhering to the surface of the mold has been spilled into the trough. At this point the body mold, free of excess polyethylene powder, may be set aside in an upright position or caused to roll along an inclined surface, so as to give opportunity to the polyethylene powder which has been softened and fused to the surface of the body mold to become coalesced or fused together in the form of a substantially homogeneous layer thereon. This requires usually about 30 to 60 seconds, more or less, and varies with the size of the body mold and the temperature to which the body mold has been preheated. At the end of this stage the fused coating or layer of polyethylene will show a more or less grainy or pebbled appearance and may even assume a smooth somewhat glassy appearance, depending on the temperature of the mold and the extent of transfer of heat from the mold to the fused polyethylene layer thereon. Usually at this point a polyethylene coating of about 20 mils thickness shall have been built up on the surface of the body mold.

After this heat soaking period the excess polyethylene powder which was discharged from the body mold during the tumbling operation, is removed from the trough and returned to the body mold where it is again subjected to the above-described inclined-tumbling or rotating coating operation. This second inclined-tumbling coating operation is again continued until sufficient heat is no longer available to sinter or incipiently fuse the excess polyethylene powder into the polyethylene coating deposited upon the surface of the body mold. Usually the entire two-step coating operation on the body mold is completed in about five minutes. More or less time may be required depending upon the size and configuration of the body mold and in order to insure a uniform, homogeneous coating of satisfactory thickness. It has been found in actual operations that the above-described second inclined-tumbling coating operation usually produces an additional polyethylene coating having a thickness of about one-half of the polyethylene coating previously deposited in the first inclined-tumbling coating operation. For example, the first inclined-tumbling coating operation may produce a coating thickness of 20 mils and the second inclined-tumbling operation may produce a coating thickness of 10 mils.

It is possible, however, to avoid the above-described two step inclined-tumbling coating operation, which is preferred, and to carry out the coating of the body mold in a single inclined-tumbling coating operation. A single inclined-tumbling coating operation, however, would require that more attention and care be given in order to insure that all the surface of the body mold is uniformly contacted with the polyethylene powder and that a polyethylene coating of uniform thickness is deposited thereon.

On conclusion of the inclined tumbling-coating operation, care is taken that the excess polyethylene powder not adhering to the coating formed on the body mold is removed to prevent the formation of bubbles and surface irregularities during the subsequent reheating operation. Usually in actual operations a coating of the same thickness can be built up on the surface of the cover mold in one wiping-coating operation as is built up on the surface of the body mold by means of the above-described two-step inclined-tumbling coating operation. However, it will be understood that the excess particles, because of their bulk and weight, will produce a wiping action of the particles adjacent the mold walls or adjacent a previously deposited layer during the inclined-tumbling coating operations.

*Reheating of the molds*

In order to build up the wall thickness of the molded polyethylene container to the desired degree, it is usually found more practical to reheat the mold sections between at least some of the applications of the polyethylene powder than to use thicker walled molds of higher heat capacity and make a complete succession of applications without any intermediate reheating. For example, after having built up a coating on the cover and body mold sections to the maximum degree possible for the heat capacity of the mold sections, say by two applications, these mold sections are subjected to a suitable heat treatment in an oven or the like in order to fuse the sintered and as yet uncoalesced polyethylene particles adhering to the surfaces of the mold sections or to previously coalesced portions of the polyethylene coating and thereby form a uniform relatively smooth, homogeneous coating. During the reheating operation it is preferred that the cover mold section remain flat with the polyethylene coating in the upper position. The body mold section may be maintained in an upright position during the reheating operation or it may be advantageously laid on its side and slowly or intermittently rolled along through a heating chamber. The cover and body mold sections should be subjected to this heat treatment for a period of time and at a temperature sufficient to form a coating that is relatively smooth, more or less grainy or even glassy in appearance. However, it should not be subjected to a heat treatment at temperatures or for a duration of time which would cause thermal decomposition of the polyethylene or substantial running or flowing of the polyethylene coating from its originally deposited position in the mold. This is particularly important with respect to the body mold since if the side walls are in a vertical position during the reheating the polyethylene coating deposited thereon may tend to run unless the temperature is carefully controlled. However, a certain amount of hardening takes place due to the oxidizing action of the furnace atmosphere in the course of the reheating treatment so that such tendency is reduced. In actual operation it has been found that satisfactory results are obtained when the cover and body molds are kept in an oven for about 14 minutes at a temperature in the range 325–360° F. Higher and lower temperatures as well as shorter and longer durations of heat treatment may be employed depending upon the particular conditions involved.

In addition to producing a relatively smooth uniform coating, the heat treatment also serves to increase the heat content of the mold sections and the polyethylene coatings deposied thereon so that if a polyethylene coating of sufficient thickness has not already been built up, sufficient heat is available to bring about the sintering fusion of the polyethylene powder applied in a subsequent coating step.

After a polyethylene coating of the desired thickness has been built up on the molds in accordance with the above-described coating operations, the final step of assembling the cover and body mold sections and of joining the cover section of powder molded polyethylene to the body section is carried out.

*Assembly of the cover and body mold sections*

After the cover and body sections of the molded polyethylene have been built up to the desired thickness and while they are associated with the respective mold sections, they are permanently joined together by assembling the cover and body mold sections with the coating deposited upon the cover mold being suitably placed in contact with the upper open end of the coating on the body mold section and pressing the mold sections into close contact by suitable means such as by screwing nuts 15 down onto the threaded lugs 12 as shown in Fig. 2. The mold assembly is then returned to the oven. Fusion of the cover coating with the open end of the body coating then takes place at a suitable elevated temperature. Ususally this final fusion or assembly-molding operation takes place in a relatively short time. For example, in the manufacture of closed, molded polyethylene drums of 55 gals. capacity, it has been found that a satisfactory joining or fusing of the cover and body coatings can be carried out at a temperature of about 360° F. in about 22 minutes. In carrying out the assembly-molding or joining step the mold assembly is preferably placed in a heated oven of the tunnel type with the assembly lying on its side so that a succession of the assemblies may be rolled along through the furnace with one withdrawn at the exit end as a new assembly is added to the assemblies undergoing the baking and joining treatment. If the assemblies are maintained stationary during their sojourn in the furnace, it is preferable to dispose them in an inverted position, that is with the body mold section above the cover mold section. Either method will insure the formation of a strong joint between the cover and side walls of the molded polyethylene drum.

It is important that the assembled cover and body mold sections be vented during the fusing operation in order to prevent the build up of pressure within the assembled mold or the formation of reduced pressure therein during the subsequent cooling and quenching operation. An increase or decrease in pressure within the assembled molds would cause relative movement between the molds and the polyethylene coating, thereby damaging the joint between the cover and body coating. Suitable means may be employed to insure that the assembled cover and body molds are vented. When the outlet flange is formed as a part of the cover section with internal threads formed therein by an externally threaded hollow pipe section as described in Ser. No. 375,625, the pipe section will be left open to permit free passage of air in and out. Likewise, if a performed outlet flange or bung is fitted into the cover mold section and welded thereto during the assembly joining step, the bung outlet will be left open. If the outlet flange is welded or fused in place after the assembly has been fused or joined together, no problem of venting is presented provided the opening in the cover mold at the area that is to receive the bung is left open.

Cooling and quenching operation

After the fusion welding together of the cover and body coatings at their zones of contact within the assembled mold sections, the mold with the closed-ended polyethylene container therein is removed from the oven and the whole quickly cooled as by application of a cold air blast or a water spray to the outside walls of the mold assembly. For example, the mold assembly may be air cooled with or without a relatively cold air blast for about 15 minutes. Thereupon a water spray may be applied. The water spray may be applied from the beginning with similar results. After the outside temperature of the mold has been brought to about room temperature, water may be introduced into the molded polyethylene container while it is still confined within the mold assembly. Care should be taken, however, to ascertain that the temperature of the molded polyethylene container has been reduced well below the boiling point of water before any water is introduced inside of the container. This step may be omitted if the external water spray is continued until the molded container has been sufficiently cooled. In either case shrinkage of the polyethylene container takes place and as a result the container tends to move away from contact with the surfaces of the cover and body mold sections. At this point the cover mold section can be removed from the body mold section and the molded polyethylene container can be easily lifted from the body mold.

It is pointed out that during the cooling and quenching operation those portions of the molded polyethylene container made up of relatively thick sections of polyethylene such as the molded outlets and the like, should be carefully and uniformly cooled to avoid formation of a relatively hard shell of cooled polyethylene around a relatively hot somewhat softer fluid mass of polyethylene. It has been observed that during the cooling and quenching operations very considerable lateral shrinkage of the polyethylene container from the sides of the body molds take place as well as a shrinkage of at least about one-eigth of an inch between the cover and bottom of the polyethylene container.

Testing and inspecting

After removal from the molds, the molded polyethylene container is visually inspected to determine the uniformity of the surface and the wall thickness, to detect the presence of any air bubbles in the joints and other critical locations as well as the condition of the substantially right angle joint between the cover and the side walls of the container. If desired, the molded polyethylene container may be subjected to a spark test with 5,000–15,000 volts of electricity to determine the porosity of the container. Additionally, the polyethylene container is subjected to a water test to detect any leaks in the walls or joints of the container.

Very satisfactory results have been obtained in the production of closed-ended molded polyethylene containers in accordance with the method described hereinabove. In actual tests it has been found that 55 gal. closed-ended molded polyethylene drums which have been made in accordance with the practice of this invention, can be completely filled with water and dropped from a height of six feet without rupturing or leaking either from the joints or from the closures of the outlets.

Figure 1:
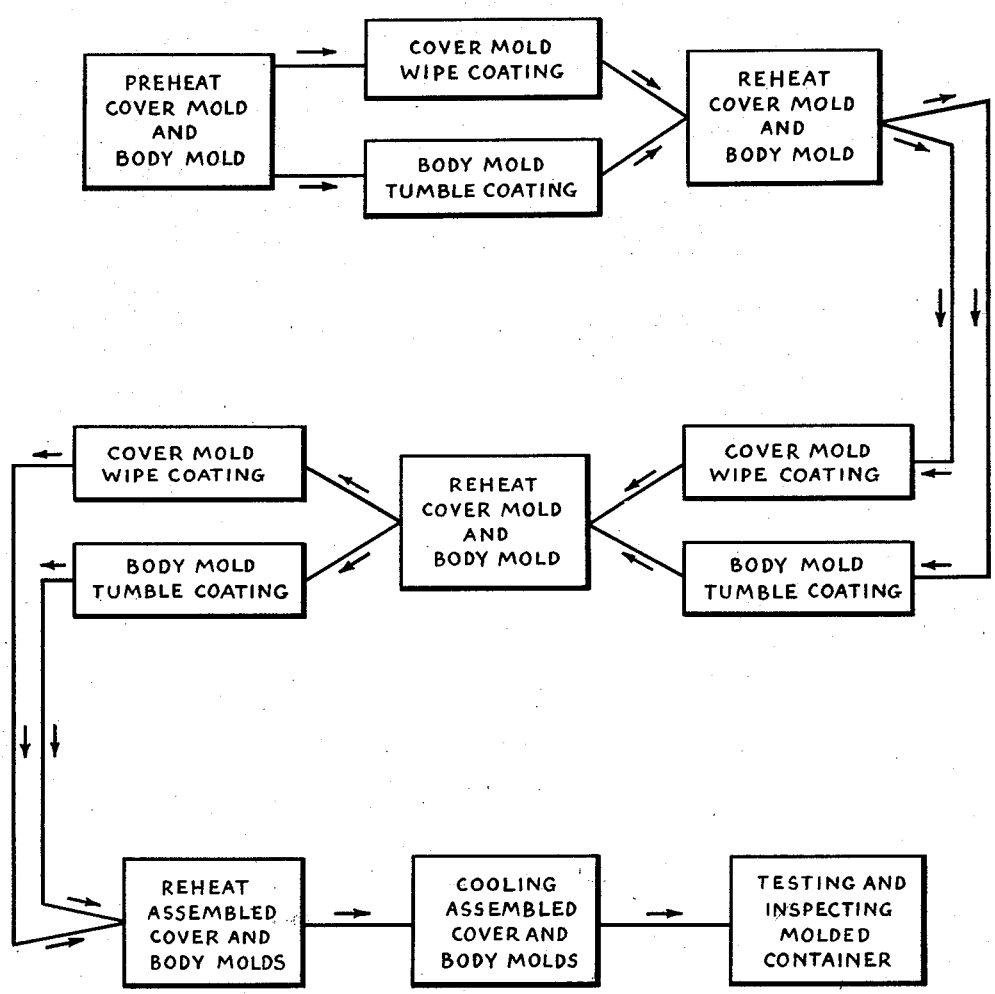
Fig. 1 is a diagrammatic representation or flow sheet outlining one arrangement or succession of steps that may be employed in practicing the method of this invention for the manufacture of closed-ended, molded polyethylene containers.

Referring now particularly to the drawings, there is shown in Fig. 1 a schematic layout of the successive steps involved in a typical application of this invention in the production of molded, closed-ended polyethylene containers. Legends have been applied to indicate generally the operations conducted. These operations have been more particularly described in the preceding description.

Fig. 2 has been previously described.

In accordance with another aspect of this invention Fig. 3 illustrates a closed-ended molded polyethylene container together with an enclosing overpack. This shipping unit is particularly suitable for commercial use since it combines the desirable physical and chemical properties of polyethylene as a material of construction for containers together with a strong, rigid overpack or enclosure which insures safe and convenient handling and makes for compactness and ease of storage.

Referring now in detail to Fig. 3 which illustrates a shipping unit drum of about 50–55 gal. capacity, a rigid enclosing overpack is indicated at 16. The overpack is formed of suitable material such as sheet iron or aluminum and is provided with rolling hoops 17 at the sides thereof for easy handling and rolling. A top cover 18 is provided and is secured to the overpack by means of a split hoop or ring 19 which locks the cover and the overpack together. Shown within the overpack is a closed, molded polyethylene container 20 provided with an outlet 21 and a smaller vent outlet 22. The outlet 21 projects through a suitable opening 23 provided in the overpack cover. The outlet 21 is shown as provided with external threads 21a for engaging a suitable closure 24. The threaded outlet 21 is also provided with a split retaining ring or washer 25, which fits into the threads 21a and is screwed down thereon into close bearing engagement with the overpack cover 18. The washer 25 may be made of metal, fiber or any other suitable material and serves the purpose of positioning the outlet 21 and the container 20 within the overpack 16 and at the same time protects the neck of the outlet 21 from being cut or abraded by the edges of the opening 23 in the overpack cover. Usually the polyethylene vent outlet 22 is provided with a similar retaining ring which is brought into bearing engagement with the overpack cover in the same way as above described. Outlet 22 is preferably located diametrically opposite outlet 21 and near the edge of cover 18.

Referring now to Fig. 4 of the drawings there is shown in vertical cross section a cubical polyethylene container 26 provided with an externally and internally threaded outlet 27 and a screw cap 28. Surrounding the container 26 is a suitable rigid overpack 29 which may be made of wood, cardboard, fiberboard and the like and which generally closely conforms to the shape of container 26. The cover 30 of the overpack is provided with an opening 31 to receive the outlet flange 27 and screw cap 28. In order to permit of stacking, the side walls of the overpack may extend above the top of the container to a sufficient distance to insure that the outlet 27 and the cap 28 will be protected by the adjacent portions of the overpack cover.

Numerous advantages, as indicated hereinabove, are obtainable in the practice of this invention. The amount of polyethylene required to form a molded polyethylene container by the blow molding technique is about three times the amount of polyethylene required to mold a container of similar volumetric capacity when manufactured in accordance with the practice of this invention. For example, a 14 gal. capacity blow-molded polyethylene container requires nine to ten pounds of polyethylene whereas a similar size container manufactured in accordance with this invention requires only about three pounds of polyethylene. Closed, integral, powder molded polyethylene containers having a plurality of outlets, not one of which is centrally located with respect to the container and each of which outlets is not only externally but also internally threaded, can be readily molded by employing the practice of this invention. Similar containers cannot be manufactured by the previously known molding methods.

Expensive and complicated molding equipment is not required in the practice of this invention and only ordinary skill is necessary for the fabrication of closed molded containers. This invention is adaptable to the manufacture of closed integral molded polyethylene containers having a wide variety of shapes and sizes and is particularly suitable for the manufacture of molded polyethylene containers having right angle joints, such as a drum.

As it will be apparent to those skilled in the art upon reading this disclosure, many modifications, changes and alterations are possible without departing from the spirit and scope of this invention.

We claim:

1. The method of forming shaped articles of polyethylene which comprises heating a mold having a shape corresponding to the desired shape of the article to a temperature sufficient to cause incipient fusion of polyethylene particles brought into contact therewith without substantial thermal decomposition of said polyethylene particles, pressing with a wiping action an excess amount of polyethylene powder onto the surface of said mold to produce a layer of at least partly coalesced polyethylene particles thereon, removing excess powdered polyethylene, reheating the mold to fuse the particles together, and thereafter cooling and removing the resulting lining from the mold.

2. A method according to claim 1 wherein the mold is heated to a temperature within the range 325–420° F. at the start of the powder molding operation.

3. A method according to claim 1 wherein the mold surfaces are treated with a releasing agent before bringing the polyethylene powder into contact with the mold surfaces.

4. The method of forming closed-ended containers by powder molding of polyethylene which comprises introducing an amount of powdered polyethylene in excess of the amount required to produce the container into a heated hollow mold having a shape corresponding to the desired shape of the container, pressing said polyethylene particles with a wiping action against the heated surfaces of said mold while they are heated sufficiently to cause sintering of the particles that are brought into contact with said heated surfaces but are insufficiently heated to cause the particles to melt and run freely away from said surfaces, continuing said wiping action until a lining of desired thickness has been built up on said surface, removing excess powdered polyethylene from said mold, cooling the mold and the molded container formed therein to release said lining from the mold, and thereafter removing the lining from the mold.

5. The method of forming containers closed at both ends by powder molding of polyethylene which comprises building up to a desired thickness on the surfaces of complementary sections of a mold conforming to the external dimensions of said container a layer of incipiently fused particles of polyethylene, associating the complementary sections of the mold so as to conform to the external shape of said container and with the contiguous edges of the polyethylene layer deposited thereon in juxtaposition, positioning the assembly with extended portions of the polyethylene layer deposited on one mold section disposed in downwardly inclined relation to the contiguous edges of the polyethylene layer deposited on the adjoining mold section, then heating said assembly to bring about fusion and running together of the polyethylene in the areas adjacent and including said contiguous edges, thereafter cooling the mold and the molded container therein and finally removing the lining from the mold.

6. The method of forming containers closed on at least one end by powder molding of polyethylene which comprises introducing an amount of polyethylene powder in substantial excess of the amount required to produce the container into a heated hollow mold having a shape corresponding to the desired shape of the container, said mold at the beginning of the molding operation being heated to a temperature within the range 300–475° F., bringing said polyethylene particles with a wiping action against the heated surfaces of said mold to soften and incipiently fuse the particles directly in contact with said mold, continuing said wiping movement of the unadhered particles until further building up of the adhered particles on the mold surface has substantially ceased, removing the excess powder, then reheating the mold to within the range 300–475° F., again introducing an excess of polyethylene powder into the mold and bringing the powder with a wiping action against the heated surfaces of the previously deposited polyethylene, and thereby further building up the layer of incipiently fused polyethylene on the mold, reheating to bring the deposited polyethylene into a fully coalesced and substantially homogeneous state, thereafter cooling to release the polyethylene coating from the mold surface and then removing the shaped polyethylene container from the mold.

7. A method of molding powdered polyethylene which comprises, heating a suitable mold to an elevated temperature sufficient to cause incipient fusion of polyethylene particles in contact therewith without substantial thermal decomposition of said polyethylene particles, the surface of said mold having in contact therewith an agent promoting separation of a fused layer of polyethylene from said mold in subsequent cooling, wiping polyethylene particles upon the said surface to produce a coherent polyethylene lining thereon and removing said lining from said mold.

8. A method of molding powdered polyethylene which comprises, introducing powdered polyethylene onto the surface of a preheated mold, said mold being at an elevated temperature sufficient to cause fusion of polyethylene particles in contact therewith without substantial thermal decomposition of said polyethylene particles, wiping said polyethylene particles upon said surface to produce a coherent polyethylene lining coextensive with said surface, continuing wiping of said polyethylene onto the mold surfaces while maintaining said mold sufficiently hot to promote further building of the thickness of lining of polyethylene formed thereon and thereafter releasing and removing said lining from said mold.

9. A method of forming an open-ended cylindrical container by powder molding of polyethylene which comprises introducing an amount of powdered polyethylene in substantial excess of that required to produce said container into a preheated mold the surface of which defines the outside surface of said container, the temperature and heat content of said preheated mold being sufficient to effect fusion of particles of said powdered polyethylene brought into contact therewith without thermal decomposition, bringing said powdered polyethylene into wiping contact with said surface to build up thereon a layer of polyethylene coextensive with said surface, removing the excess powder and rotating said mold to promote fusion of the adhered particles and even distribution of the fused polyethylene on the mold surfaces, introducing an additional amount of polyethylene powder and repeating the wiping of said mold surfaces to further build up the thickness of the polyethylene layer, reheating the mold to complete the fusion of the added particles with the previously formed layer, and thereafter cooling and removing the molded polyethylene from the mold.

10. A process of forming a closed-ended, molded polyethylene container having only substantially right angle joints between the side walls and the top and bottom of said container comprising pre-heating the molds employed to form said container to a temperature sufficient to soften and melt the polyethylene without any substantial thermal decomposition, said molds comprising a cover mold and a body mold, said body mold comprising side walls and a bottom, contacting the surface of said cover mold with a mass of solid, discrete particles of polyethylene, applying force to said mass of polyethylene particles so as to press said particles toward and along the surface of said cover mold, thereby producing a wiping action upon the surface of the cover mold by the polyethylene particles immediately adjacent said surface and so as to substantially completely contact the surface of the cover mold with said polyethylene particles, removing excess polyethylene particles from the surface of said cover mold, reheating said cover mold containing a resulting polyethylene coating thereon to the aforesaid temperature, repeating the aforesaid operations of coating and reheating until the desired thickness of polyethylene coating has been built up on said cover mold, introducing into contact with the surface of the body mold a mass of solid, discrete particles of polyethylene substantially in excess of that required to form the desired thickness of coating thereon, tumbling said mass of polyethylene particles within said body mold so as to substantially completely contact the interior of said body mold with said polyethylene particles, removing the excess polyethylene particles from said body mold, reheating said body mold to a temperature sufficient to soften and melt said polyethylene coated thereon without any substantial thermal decomposition of said polyethylene, repeating the aforesaid coating and reheating operations until the desired thickness of coating has been built up on said body mold, assembling said body and cover molds together so that the polyethylene coating on said molds, when brought together assumes the shape of said container and heating the assembled molds for a period of time sufficient to insure fusion of the polyethylene coating of the cover mold with the polyethylene coating of the body mold and quenching the assembled molds so as to cool the resulting molded container.

References Cited in the file of this patent

UNITED STATES PATENTS

| | | |
|---|---|---|
| 2,133,027 | Honig | Oct. 11, 1938 |
| 2,172,864 | Calva et al. | Sept. 12, 1939 |
| 2,194,451 | Soubier | Mar. 19, 1940 |
| 2,232,475 | Renfrew et al. | Feb. 18, 1941 |
| 2,602,962 | Deakin | July 15, 1952 |

FOREIGN PATENTS

| | | |
|---|---|---|
| 567,012 | Great Britain | Jan. 24, 1945 |